US006835422B2

(12) United States Patent  
Kobe et al.

(10) Patent No.: US 6,835,422 B2  
(45) Date of Patent: Dec. 28, 2004

(54) METHOD OF PREPARING AN ADHESIVE ARTICLE

(75) Inventors: James J. Kobe, Newport, MN (US); Junkang Jacob Liu, Woodbury, MN (US); Jolin A. Harrison, Hudson, WI (US); Bradley S. Momchilovich, Stillwater, MN (US); Raymond R. Rivera, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/842,830

(22) Filed: May 11, 2004

(65) Prior Publication Data

US 2004/0209002 A1 Oct. 21, 2004

Related U.S. Application Data

(62) Division of application No. 09/775,955, filed on Feb. 2, 2001, now Pat. No. 6,780,484.

(51) Int. Cl.$^7$ .................................................. C08J 7/04
(52) U.S. Cl. .................... 427/496; 427/177; 427/208.4; 427/208.8; 427/377; 427/385.5; 427/386; 427/387; 427/388.1; 427/407.1; 427/410; 427/551; 427/595
(58) Field of Search ................................ 427/496, 177, 427/208.4, 208.8, 377, 385.5, 386, 387, 388.1, 407.1, 410, 551, 595

(56) References Cited

U.S. PATENT DOCUMENTS

| | | | |
|---|---|---|---|
| 2,956,904 A | 10/1960 | Hendricks | |
| 3,897,295 A | 7/1975 | Dowbenko et al. | |
| 4,378,278 A | 3/1983 | Allaway et al. | |
| 4,906,421 A | 3/1990 | Plamthottam et al. | |
| 5,100,728 A | 3/1992 | Plamthottam et al. | |
| 5,180,635 A | 1/1993 | Plamthottam et al. | |
| 5,847,649 A | 12/1998 | Collins | |
| 5,945,174 A | 8/1999 | Shaw | |
| 6,103,152 A | 8/2000 | Gehlsen et al. | |

FOREIGN PATENT DOCUMENTS

| | | |
|---|---|---|
| EP | 0 472 351 A2 | 8/1991 |
| JP | 02252783 | 10/1990 |
| JP | 2000345113 | 12/2000 |
| WO | WO 95/20635 | 8/1995 |
| WO | WO 98/07798 | 2/1998 |
| WO | WO 98/40439 | 9/1998 |

OTHER PUBLICATIONS

"Handbook of Pressure Sensitive Adhesive Technology", Van Norstrand Reinhold Co., Inc., 2$^{nd}$ ed., Chapters 23 and 24 (1989) (no month avail.).

*Primary Examiner*—Bernard Pianalto

(57) ABSTRACT

A method of producing an adhesive article including the steps of applying release coating compound(s) to a second side of a liner backing; applying an adhesive onto a first side of said coated liner backing; crosslinking said adhesive with E-Beam radiation applied through the second side of said liner backing; and winding said article into a roll.

25 Claims, 2 Drawing Sheets

METHOD OF PREPARING AN ADHESIVE ARTICLE

CROSS REFERENCE RELATED TO APPLICATIONS

This application is a divisional of U.S. application Ser. No. 09/775,955, filed Feb. 2, 2001, now U.S. Pat. No. 6,780,484 the disclosure of which is herein incorporated by reference.

FIELD OF THE INVENTION

The invention relates to adhesive articles and the production thereof.

BACKGROUND OF THE INVENTION

Adhesive tape comes in many varieties; for example, transfer tape, single-sided tape, and double-sided tape. The adhesive tape can be a foamed or non-foamed tape. Double-sided adhesive tape has adhesive properties on both sides. The macro-structure and method of producing standard double-sided adhesive tape is relatively simple and one method of production and the resulting structure is as follows. The adhesive polymer that is to make up the actual adhesive tape is readied and extruded by some acceptable method. Next, the adhesive polymer is immediately combined with a liner. Suitable liners for double-sided adhesive tapes include backings that have been coated on both sides with a release coating. The liner and the adhesive polymer are then laminated to form the double-sided adhesive tape product.

In high performance adhesive tapes, typically the next step is to crosslink the adhesive polymer. It is generally advisable to crosslink the adhesive polymer because it imparts desirable properties to the final product, such as improving the cohesive strength of the adhesive. Crosslinking can be accomplished by exposing the adhesive polymer to radiation (e.g., electron beam, ion beam or ultraviolet radiation). The double-sided adhesive tape product is then wound into a roll so that both surfaces of the double-sided adhesive tape are covered with a liner, the first surface already being covered with a liner because of the method of production, and the second surface of the adhesive tape being covered with the side of the liner that was not covered with the adhesive polymer initially. Double-sided adhesive tape produced in this manner is designed to have a differential release liner, so that when the tape is unwound, the liner remains on the "right side" of the adhesive tape. Liner release is the force required to remove a liner from the adhesive on a tape.

Production of double-sided adhesive tape by this method is desirable, but significant problems are encountered when electron beam ("E-Beam") radiation is used to crosslink the adhesive polymer. E-Beam radiation is advantageous as a method of crosslinking because it is effective to crosslink adhesive polymers that have high amounts of pigments or fillers, and/or adhesive films of greater thicknesses. If the adhesive polymer is exposed to E-Beam radiation ("E-Beam treated") through the non-liner side (before winding), the adhesive properties of the adhesive polymer itself are altered. For example, a 6 Megarads (Mrads) E-Beam dose may cause the adhesion on the E-Beam treated side of an acrylic adhesive polymer to be diminished 30 to 50%. In order to maintain an acceptable level of adhesion on both sides of the double-sided adhesive tape, the adhesive polymer must be E-Beam treated through the liner side.

The surface chemistry of silicone-coated liners traditionally used in double-sided adhesive tape is also altered when E-Beam treated. When the adhesive polymer is E-Beam treated through the liner, the liner release of the side of the liner contacting the adhesive polymer is only slightly increased. In contrast, the liner release on the other side of the liner, i.e., the non-adhesive side treated with E-Beam, is greatly increased. This increase in liner release is detrimental because the non-adhesive side of the liner comes in contact with the adhesive polymer once it is wound into its final product roll. This creates an undesirable situation in the final product wherein the liner is removed from the "right side" of the adhesive tape before the "wrong side". This is known as "liner confusion". In some cases, the liner cannot even be removed. This is known as "liner blocking". Even when the adhesive is E-Beam treated directly (i.e., not through the liner), the side of the liner opposite the adhesive will be affected if the radiation penetrates through the liner.

One solution to this problem has been to manufacture the double-sided adhesive tape on a temporary liner, crosslink the adhesive with E-Beam radiation, and then replace the temporary liner with another liner before it is packaged into the final product. However, this solution is unacceptable because it adds to the complexity of the process, increases waste of the process, and adds the additional cost of another liner. Therefore, there is a need for a liner that can be E-Beam treated while still maintaining essentially the same pre-E-Beam treated release characteristics so that it need not be replaced before the consumer can utilize the final product.

SUMMARY OF THE INVENTION

The invention offers adhesive articles and methods of producing the articles. The adhesive articles of the invention include a liner having a first side and a second side, and an adhesive having a first surface and a second surface, wherein the second surface of the adhesive contacts the first side of the liner, wherein the article has been exposed to E-Beam radiation through the second side of the liner, and wherein the article has been wound upon itself causing the second side of the liner to come into contact with the first surface of the adhesive and wherein the liner release of the second side of the liner to the first surface of the adhesive is sufficiently different (different enough to avoid liner confusion) from the liner release value of the first side of the liner to the second surface of the adhesive. Generally, the liner release value of the second side of the liner to the first surface of the adhesive is less than 280 g/in (110 g/cm). Preferably, the liner release value of the second side of the liner to the first surface of the adhesive is less than 150 g/in (59 g/cm), and most preferably is less than 100 g/in (39 g/cm), e.g., less than 50 g/in (20 g/cm), or less than 30 g/in (12 g/cm).

The invention also includes a method of producing adhesive articles, including the steps of applying release coating material(s) to a second side, and optionally to a first side, of a liner backing, applying an adhesive onto a first side of said coated liner backing; crosslinking said adhesive with E-Beam radiation applied through the second side of said coated liner backing; and winding said article into a roll. Preferably, the release coating material for the liner backing comprises at least one material chosen from the group consisting of: alkoxysilane silicones, acetoxysilane silicones, silanol silicones, epoxy silicones, and vinyl silicones, and preferably comprises silanol-terminated silicones.

DETAILED DESCRIPTION OF THE PREFERRED EMBODIMENTS

1. Structure and Method of Producing Adhesive Tape

Figure 1:
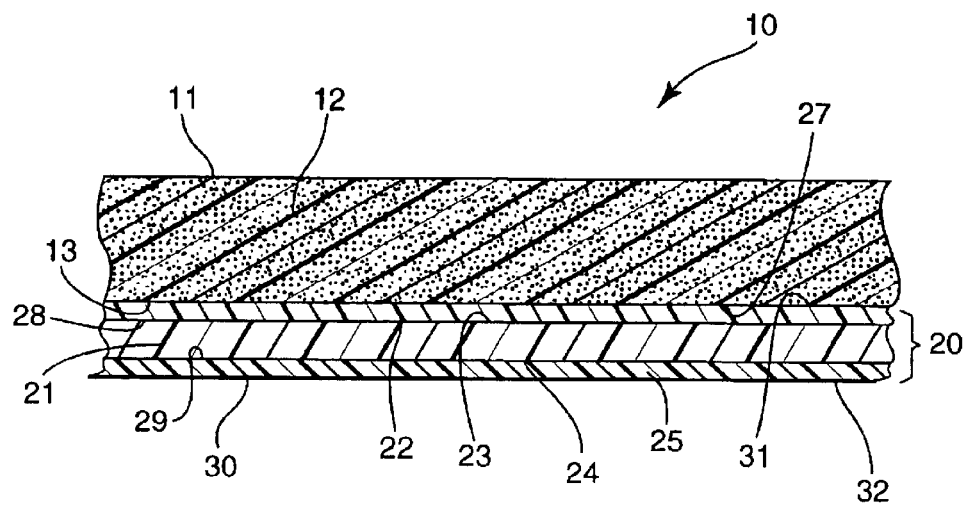
FIG. 1 is a representation of a vertical cross-section of a general structure of double-sided adhesive tape.

FIG. 1 depicts a vertical cross-section of one configuration of a double-sided adhesive tape 10 after its production and before it has been packaged. The double-sided adhesive tape 10 includes an adhesive 12. Polymers that can be used in the adhesive 12 are discussed more fully below. The adhesive 12 is generally formed in a sheet and has a first surface 11 and a second surface 13. When the double-sided adhesive tape 10 is produced, one method of production leaves the first adhesive surface 11 uncovered.

The double-sided adhesive tape 10 also includes a liner 20. The liner 20 includes a liner backing 21. Suitable materials for the liner backing 21 are discussed more fully below. The liner backing 21 has a first surface 23 and a second surface 24. The liner 20 includes a first release coating 22 and a second release coating 25. While FIG. 1 shows liner 20 with first release coating 22, liner backing 21 may have sufficient liner release such that first release coating 22 is not necessary. If used, first release coating 22 is applied to the first surface 23 of the liner backing 21. The second release coating 25 is applied to the second surface 24 of the liner backing 21. The first release coating 22 has a release side 27 next to the second surface 13 of the adhesive 12 and a liner backing side 28. The release side 27 of the first release coating 22 also defines a first surface 31 of liner 20. The second release coating 25 has a liner backing side 29 and a non-liner backing side 30. The non-liner backing side 30 of the second release coating 25 also defines a second surface 32 of liner 20. The first and second release coatings 22 and 25 can be composed of the same or different material. Preferably, the first and second release coatings 22 and 25 are composed of different materials.

Figure 2:
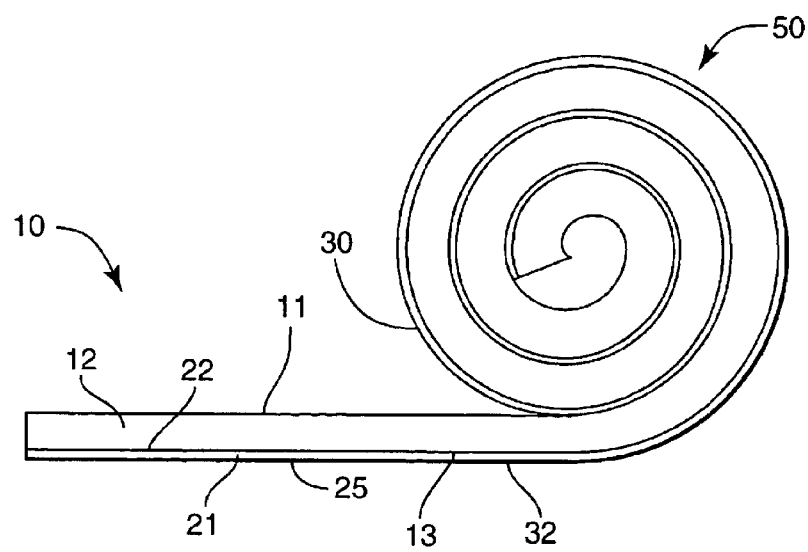
FIG. 2 is a schematic representation of a possible method of winding up double-sided adhesive tape to make a finished roll for packaging.

FIG. 2 depicts one method of readying a double-sided adhesive tape 10 for packaging. The double-sided adhesive tape 10 is wound around itself into a roll to form a packagable article 50. In use, double-sided adhesive tape is unwound, optionally cut, and applied to a surface with the exposed side of the adhesive 12 (the first side 11 discussed above) and the liner 21 is then removed. Optionally, the second side 13 of the adhesive 12 is applied to a second surface after the liner 21 is removed. This method of forming a packagable article 50 results in portions of the double-sided adhesive tape 10 interacting with other portions of the double-sided adhesive tape 10. Once the double-sided adhesive tape 10 begins to be wound on itself, the first surface 11 of the adhesive 12 comes into contact with the non-liner backing side 30 of the second release coating 25 (also referred to as the second surface 32 of liner 20).

The contact of the non-liner backing side 30 of the second release coating 25 and the first surface 11 of the adhesive 12 becomes important when the packagable article 50 is unrolled to use the double-sided adhesive tape 10. It is desirable that the adhesive 12 and the liner 20 maintain contact through the second surface 13 instead of the first surface 11 of the adhesive 12. Therefore, the liner 20 should release preferentially from the first surface 111 before it releases from the second surface 13 of the adhesive 12. Thus the liner 20 should have a liner release from the first surface 11 of the adhesive 12 that is sufficiently different from the liner release from the second surface 13 of the adhesive 12. The second surface 32 of liner 20 and adhesive 12 are configured so that this differential effect is developed. For example, this differential effect is seen when the liner release value of the second surface 32 of the liner 20 to the adhesive 12 is less than about 280 g/in (110 g/cm). Preferably, the liner release value of the second surface 32 of the liner 20 to the adhesive 12 is less than about 150 g/in (59 g/cm). More preferably, the liner release value of the second surface 32 of the liner 20 and the adhesive 12 is less than about 100 g/in (39 g/cm), e.g., less than about 50 g/in (20 g/cm) and less than about 30 g/in (12 g/cm).

Figure 3:
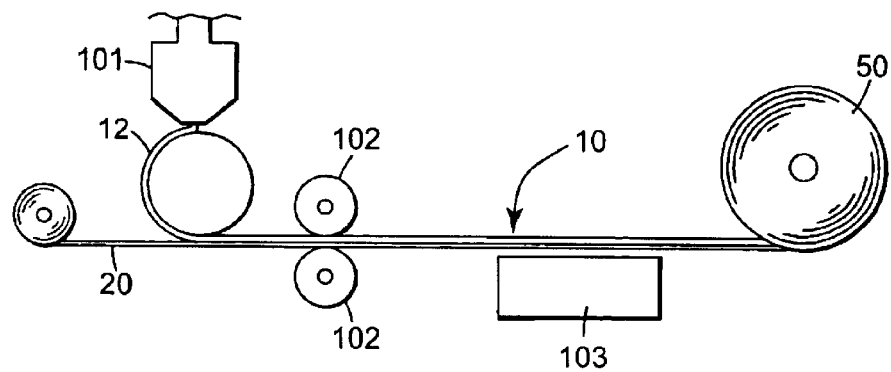
FIG. 3 is a schematic representation of an example of a machine that can manufacture double-sided tape.

FIG. 3 schematically depicts one method of producing double-sided adhesive tape 10 and forming it into a packagable article 50. The adhesive 12 is dispensed from a dispenser 101 onto a liner 20. Next the liner 20 and the adhesive 12 are laminated together between a pair of nip rollers 102 to form the double-sided adhesive tape 10. Then, the double-sided adhesive tape 10 is exposed to radiation from a radiation source 103 through the liner 20 to cause crosslinking of the adhesive 12. The radiation source 103 is preferably an E-Beam source. The double-sided adhesive tape 10 is then formed into a packagable article 50 by winding upon itself to form a roll.

Figure 4:
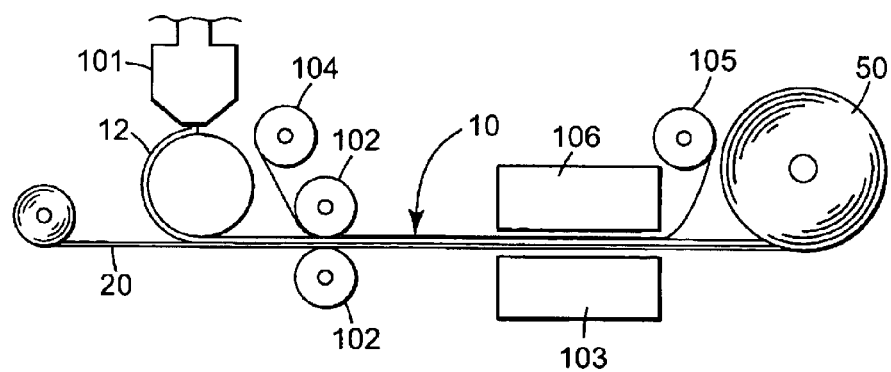
FIG. 4 is a schematic representation of manufacturing an adhesive tape with two liners.

FIG. 4 schematically depicts another method of producing double-sided adhesive tape 10 and forming it into a packagable article 50. This method is similar to that depicted in FIG. 3 with the addition of a second liner 104. Second radiation source 106 is preferably an E-Beam source. Second liner 104 is fed in and laminated together with the adhesive 12 and first liner 20 between nip rollers 102. Adhesive tape 10 is then E-Beam treated simultaneously, or sequentially, through second liner 104 and through first liner 20. Second liner 104 can then, alternatively, be removed from the adhesive tape 10 by roller 105 to expose the adhesive 12. This is important when the thickness of adhesive 12 is such that E-Beam radiation is not sufficient to crosslink the adhesive 12 from only one side.

The invention also is applicable for single-sided adhesive tapes where the liner is to be left in place to form the backing of the single-sided tape.

2. Liner Backing and Release Coatings

A. Liner Backing

Suitable materials for the liner backing 21 include, for example: polymeric films, such as polyester films (e.g., polyethylene terephthalate films) and polyolefin films (e.g., polyethylene films, polypropylene films, biaxially oriented polypropylene films (BOPP films)); metallized film; sealed paper (e.g., polyethylene-coated paper, metallized paper, and clay-coated paper); and paper. The liner backing 21 can be coated with a release coating on the first and/or second surfaces 23 and/or 24.

B. Optional First Release Coating

When present, the first release coating 22 on the first surface 23 of the liner backing 21 can include conventional release coating materials, including those that are known in the art, e.g., chemistries using the following curing mechanisms: condensation cure, addition cure, radical cure, cation cure, and triggered condensation cure. See also PCT Publication No. WO 98/40439 and *Handbook of Pressure Sensitive Adhesive Technology,* 2nd ed., Chapters 23 and 24, Van Norstrand Reinhold Co., Inc. (1989) for further examples.

C. Second Release Coating

The second release coating 25 on the second surface 24 of the liner backing 21 is a coating that is resistant to E-Beam treatment. When silicone is used as the second release coating 25, it is preferred that the release coating materials comprise tightly crosslinked siloxane networks with minimal polar or reactive functionalities, especially radical reactive functionalities. It is known that chemical bond cleavage will occur from excited states in an irradiated polymer when a polymer is exposed to E-Beam radiation, which leads to radical formation. The radicals formed have a short life and will either recombine with other radicals to lose their reactivity, react with a polymer, or react with other functional groups to create radicals having a longer life. The long lived radicals can further react with oxygen ($O_2$), for example, and give a relatively stable peroxide compound when the irradiated material is exposed to an oxygen containing environment (i.e., radiation-oxidation) as shown schematically below.

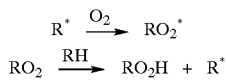

Thus formed peroxides ($RO_2H$) have a much longer life so that they may be able to migrate to the adhesive-release interface to further react (or interact) with the adhesive. This causes higher liner release values (meaning that a relatively undesirable high unwind force is required) or liner blocking. To avoid liner blocking and make the second release coating 25 function in the desired way, the release coating material should contain minimal radical reactive functionalities, such as the acrylate, methacrylate, vinyl, and silicon hydride functionalities.

A tightly crosslinked network in the release coating is also useful because it can greatly restrict mobility of radicals generated (e.g., during E-Beam treatment) so that further radical transfer reactions can be minimized. When a tightly crosslinked network is used, it is better that the crosslinks be nonpolar links, so that the polar functionality will not significantly interact with the adhesive.

When the second release coating 25 comprises materials with these properties, the liner 20 advantageously releases from the first surface 11 before it releases from the second surface 13 of the adhesive 12, even after the double-sided adhesive tape 10 has been exposed to a source 103 of, for example, E-Beam radiation.

Silicone or polydimethylsiloxane is the most important and widely used release material. Silicones are polymers based on organosilicon chemistry where both the carbon—silicon bond and the silicon—oxygen bonds are nonpolar chemical bonds. Being nonpolar, silicones have extremely low intermolecular forces that may cause liquid or gum like material. Therefore, to obtain a release coating resistant to radical migration, the polymer is generally crosslinked. Crosslinking can be either physical crosslinking or chemical crosslinking. Chemical crosslinking is also referred to as "curing" in this patent application.

Among the silicone cure chemistries, radical cure, cation cure, and triggered condensation cure all may give tightly crosslinked networks since the coating formulations from those chemistries have a long pot life. However, for cation and radical cure, it may be difficult to achieve a high crosslink density together with minimal polar groups since the crosslinking groups are polar groups (i.e., ether groups in a cation cure and ester groups in a radical cure). Thus cation and radical cure chemistries may not provide the desired release when they are E-Beam treated and laminated to the adhesive. However, they may be formulated to have an acceptable release for second release coating 25. On the other hand, condensation cure and addition cure may give cured networks without polar groups (i.e., their crosslinks are nonpolar groups, e.g., Si—O—Si in condensation cure, and $CH_2CH_2$ in addition cure). In practice, however, it is difficult to have highly crosslinked networks with either chemistry. This is especially true for condensation cure since such chemistries generally have too short of a pot life to coat. For addition cure, it is also important to have a balanced stoichiometry in order to minimize any residual SiH and SiCH=$CH_2$ moieties in the composition after cure thereof. These moieties are generally radically reactive.

Triggered condensation cure provides a useful approach to obtain a crosslinked silicone network with high crosslink density, minimal polar functionality, and minimal radically reactive groups. The details of one such cure chemistry are disclosed in PCT Publication No. WO 98/40439. As described therein, triggered condensation cure components comprise crosslinkers, acid generators (catalyst), and optional reactive diluents. Liu discloses a number of examples of compounds useful as crosslinkers, acid generators, and reactive diluents.

Preferred examples of crosslinkers include alkoxysilane compounds, acetoxysilane compounds, and silanol compounds with more than two reactive functionalities, such as: $(EtO)_3Si(CH_2)^8Si(OEt)_3$, $(MeO)_3SiCH_2CH_2Si(OEt)_3$, $(EtO)_2MeSi(CH_2)_6SiMe(OEt)_2$, $(EtO)_3SiCH_2CH_2(SiMe_2O)_nSiCH_2CH_2Si(OEt)_3$, and

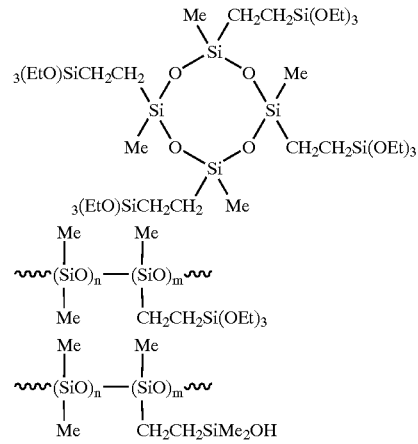

where m and n are independent integers from about 1–2000.

Preferred examples of reactive diluents include silanol-terminated siloxanes, alkoxysilane-terminated siloxanes, and acetoxysilane-terminated siloxanes, such as:

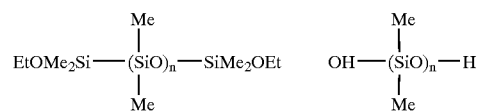

The crosslink density is controlled by adjusting the chain length of polydimethylsiloxane (PDMS) or the length of the individual repeating units in PDMS in either the reactive diluent and/or crosslinker if a polymeric crosslinker is used. The value of n represents an average degree of polymerization between crosslinks that is related to chain length between crosslink points (i.e., crosslink density), and should have a value of less than about 50 for second release coating 25, preferably less than about 20 and more preferably less than about 12, for example, about 8. Usually, the shorter the PDMS chain length or smaller the number of repeating units (i.e., smaller n), the higher the crosslink density of the cured silicone network.

Preferred examples of catalysts include iodonium salts, sulfonium salts, and fluorinated esters, such as: $R_2PhI^+ SbF_6^-$, and $R_2PhI^+B(PhF_5)_4^-$ where R is an aliphatic organic group, for example, dodecyl.

D. General procedure to make release liners

Any suitable methods can be used to coat release liners. Typical release coating weights are greater than about 0.2 g/m² and more typically are from about 0.7 g/m² to about 1.9 g/m². Liner release values observed in liner backings that have been E-Beam treated vary both with coating weight and the specific liner backing utilized. An example of utilizing different coating weights for different liner backing materials can be seen in Example 1.

Additives such as for example, fillers, antioxidants, viscosity modifiers, pigments, release modifiers can be added to both the first and second release coatings (22 and 25) to the extent that they do not alter the desired properties of the final product.

Once release coating formulations are chosen, the components are mixed and delivered to a coater. Useful coating methods include, for example, bar coating; roll coating (e.g., gravure coating, offset gravure coating (also called 3-roll coating), and 5-roll coating); spray coating, curtain coating; and brush coating.

The release coating formulations are coated directly onto the liner backing, either from 100% solids or from a solution. Useful liner backings include, but are not limited to, polyester (e.g., PET), polyolefin (e.g., polyethylene, polypropylene, biaxially oriented polypropylene (BOPP)), polycoated paper, metallized paper, clay sealed paper, and metallized films. The surfaces of the liner backing may be further treated to enhance release coating anchorage to the liner backing chemically or physically, for example, with a primer, corona treatment, or flame treatment.

After the release coating is coated onto the liner backing, the coated liner backing is cured, for example, by ultraviolet (UV) or thermal radiation, depending on the requirements of the system. Examples of useful UV lights include high intensity UV lights, such as H FUSION lamps (commercially available from Fusion UV Curing Systems, Rockville, Md.) and medium pressure mercury lamps. When solvent-based formulations are used as release coatings, treatment in a thermal oven also may be needed before UV curing to remove solvents.

This general procedure works for both the first release coating 21 and second release coating 25. Generally, the first release coating 21 is coated before the second release coating 25. Alternatively, both release coatings 21 and 25 may be coated and cured at the same time.

3. Adhesive

A variety of different polymer resins, as well as blends thereof, are suitable for use in the adhesive 12, with resins suitable for melt extrusion processing being most desirable. The particular resin is selected based upon the desired properties of the final article. An example of a class of polymer resins useful in the adhesive 12 can be found in U.S. Pat. No. 6,103,152. It may be desirable to blend two or more acrylate polymers having different chemical compositions. A wide range of physical properties can be obtained by manipulation of the type and concentration of the blend components.

One class of polymers useful for the adhesive 12 includes acrylate and methacrylate polymers and copolymers. Such polymers are formed, for example, by polymerizing one or more monomeric aciylic or methacrylic esters of non-tertiary alkyl alcohols, with the alkyl groups having from 1 to about 20 carbon atoms (e.g., from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate and cyclobenzyl acrylate.

Optionally, one or more monoethylenically unsaturated co-monomers may be polymerized with the acrylate or methacrylate monomers. The particular type and amount of co-monomer is selected based upon the desired properties of the polymer. One group of useful co-monomers includes those having a homopolymer glass transition temperature greater than the glass transition temperature of the (meth) acrylate (i.e., acrylate or methacrylate) homopolymer. Examples of suitable co-monomers falling within this group include acrylic acid, acrylamides, methacrylamides, substituted acrylamides (such as N,N-dimethyl acrylamide), itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkyl(meth)-acrylates, N,N-dimethyl aminoethyl (meth)acrylate, N,N-diethylacrylamide, beta-carboxyethyl acrylate, vinyl esters of neodecanoic, neononanoic, neopentanoic, 2-ethylhexanoic, or propionic acids (e.g., those available from Union Carbide Corp. of Danbury, Conn. under the designation "Vynates") vinylidene chloride, styrene, vinyl toluene, and alkyl vinyl ethers.

A second group of monoethylenically unsaturated co-monomers that may be polymerized with the acrylate or methacrylate monomers includes those having a homopolymer glass transition temperature (Tg) less than the glass transition temperature of the acrylate homopolymer. Examples of suitable co-monomers falling within this class include ethyloxyethoxy ethyl acrylate (Tg=−71 degrees Celsius) and a methoxypolyethylene glycol 400 acrylate (Tg=−65 degrees Celsius; available from Shin Nakamura Chemical Co., Ltd. under the designation "NK Ester AM-90G").

A second class of polymers useful in the adhesive 12 includes semicrystalline polymer resins, such as polyolefins and polyolefin copolymers (e.g., polymer resins based upon monomers having between about 2 and about 8 carbon atoms, such as low-density polyethylene, high-density polyethylene, polypropylene, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with a base), and cellulose acetate. Other examples of polymers in this class include amorphous polymers such as polyacrylonitrile, polyvinyl chloride, thermoplastic polyurethanes, aromatic epoxies, polycarbonates, amorphous polyesters, amorphous polyamides, ABS block copolymers, polyphenylene oxide alloys, ionomers (e.g., ethylene-methacrylic acid copolymers neutralized with salt), fluorinated elastomers, and polydimethyl siloxane.

A third class of polymers useful in the adhesive 12 includes elastomers containing ultraviolet radiation-activatable groups. Examples include polybutadiene, polyisoprene, polychloroprene, random and block copolymers of styrene and dienes (e.g., SBR), and ethylene-propylene-diene monomer rubber. This class of polymer is typically combined with tackifying resins.

A fourth class of polymers useful in the adhesive 12 includes pressure sensitive and hot melt applied adhesives prepared from non-photopolymerizable monomers. Such polymers can be adhesive polymers (i.e., polymers that are inherently adhesive), or polymers that are not inherently adhesive but are capable of forming adhesive compositions when compounded with components such as plasticizers, or tackifiers. Specific examples include poly-alpha-olefins (e.g., polyoctene, polyhexene, and atactic polypropylene), block copolymer-based adhesives, natural and synthetic rubbers, silicone adhesives, ethylene-vinyl acetate, and epoxy-containing structural adhesive blends (e.g., epoxy-acrylate and epoxy-polyester blends).

The adhesive 12 may also optionally have other components in it. Normal additives, such as fillers, antioxidants, viscosity modifiers, pigments, tackifying resins, fibers, and the like can also be added to the adhesive 12, to the extent that they do not alter the desired properties of the final product.

A preferred optional additive is a pigment, or a light blocking fillers. Any compound generally used as a pigment can be utilized, as long as the desired properties of the final product are not altered thereby. Exemplary pigments include carbon black and titanium dioxide. The amount of pigment also depends on the desired use of the product. Generally, the concentration of pigment is greater than about 0.10% by weight. Preferably, the concentration of pigment is greater than about 0.15% by weight, and more preferably greater than about 0.18% by weight to give the adhesive 12 an opaque color.

The thickness of the adhesive 12 varies depending on the use of the product. In the case of certain foam adhesive products, preferably the thickness of adhesive 12 is greater than about 250 μm. More preferably, the thickness is greater than about 500 μm.

4. Electron Beam Radiation

The adhesive 12 utilized in the invention is preferably crosslinked by radiation. The adhesive 12 is crosslinked to impart more desirable characteristics to the double-sided adhesive tape 10, such as increased strength. One method of crosslinking is using electron-beam ("E-Beam") radiation. E-Beam radiation is advantageous because it can crosslink polymers that other methods cannot, such as highly pigmented adhesives, adhesives with fillers, and relatively thick layers of adhesives.

E-Beam radiation causes crosslinking of the adhesive by initiating a free-radical chain reaction. Ionizing radiation from the E-Beam is absorbed directly in the polymer and generates free radicals that initiate the crosslinking process. Generally, electron energies of about 100 keV are necessary to break chemical bonds and ionize, or excite, components of the polymer system. Therefore, the scattered electrons that are produced to a large population of free radicals throughout the adhesive. These radicals initiate the polymerization reaction. This polymerization process results in a three-dimensional crosslinked polymer.

An E-Beam processing unit supplies the radiation for this process. Generally, a processing unit includes a power supply and an E-Beam acceleration tube. The power supply increases and rectifies the current, and the accelerator generates and focuses the E-Beam and controls the scanning. The E-Beam may be produced, for example, by energizing a tungsten filament with high voltage. This causes electrons to be produced at high rates. These electrons are then concentrated to form a high energy beam and are accelerated to full velocity inside the electron gun. Electromagnets on the sides of the accelerator tube allow deflection, or scanning, of the beam.

Scanning widths and depths vary from about 61–183 cm to about 10–15 cm, respectively. The scanner opening is covered with a thin metal foil, usually titanium, which allows passage of electrons, but maintains the high vacuum. Characteristic power, current, and dose rates of accelerators are about 200–500 keV, about 25–200 milliamps (mA,) and about 1–10 megarads (Mrads), respectively.

The invention will be more fully appreciated by referring to the following non-limiting examples.

EXAMPLES

All amounts given in the Examples are in parts by weight, unless otherwise specified. "Room temperature" is about 22 deg. C., unless otherwise specified. In the Examples, E-Beam treatment was conducted under full nitrogen purge conditions, unless otherwise stated. When the oxygen level was monitored, it typically was less than 10 ppm oxygen, and most likely was less than 2.5 ppm oxygen. This is referred to in the Examples as a "low oxygen level".

Test Methods

Liner Release

The coated side of an approximately 6 inch (15 cm) wide by 18 inch (46 cm) long sheet of liner prepared as in the Examples was laminated to an approximately 6 inch (15 cm) wide by 18 inch (46 cm) long sheet of a foam tape as specified in the Examples. The liner was rolled onto the foam tape with a 4.5 lb (2.0 kg) rubber roller. A one inch (2.5 cm) wide by 6 inch (15 cm) long sample strip was cut from the prepared laminate.

The force necessary to remove the liner from the foam tape at 180 degrees and at a peel rate of 90 inches per minute (229 cm/minute) was measured using an I-MASS tester (Model SP-2000 Slip/Peel Tester), commercially available from I-MASS, Inc., Accord (Hingham) MA, after allowing the test tape to dwell in contact with the liner as specified in the Examples. Liner release was measured in grams per inch (g/in) using an integrated average over 5 seconds test time and converted to grams per centimeter (g/cm).

90 Degree Peel Adhesion

A one inch (2.5 cm) wide by 6 inch (15 cm) long sample strip was cut from the laminate prepared for the Liner Release Test Method. A 5 mil (0.127 mm) thick by 1.12 inch (2.86 cm) wide anodized aluminum strip was laminated to the side of the foam tape opposite the test liner.

The liner was then removed and the exposed adhesive side of the foam tape was bonded to either stainless steel, aluminum, or glass test panels. The bonded samples were allowed to dwell at room temperature for the specified time before testing. 90 Degree Peel Adhesion was determined at a peel rate of 12 inches per minute (30 cm/minute) and was measured using an INSTRON tester, commercially available from Instron Corporation, Canton, Mass. 90 Degree Peel Adhesion was measured in pounds per inch width (piw) and converted to Newtons per cm (N/cm).

Example 1

In this example, the effect of E-Beam radiation on liner release values was determined when the order of process steps was varied.

A silicone composition was prepared by the following method: 85 parts silanol-terminated polydimethyl siloxane (available as GELEST DMS-S12 from Gelest, Inc., Tullytown, Pa.), 15 parts bistriethoxysilyl octane (available as GELEST SIB-1824 from Gelest, Inc., Tullytown, Pa.) and 2 parts bisdodecylphenyl iodonium hexafluoroantimonate were combined at room temperature, with mixing, until well blended (about 10 minutes). The resultant composition was coated onto one side of a 2 mil (0.0508 mm) thick, flame-treated, biaxially oriented polypropylene (BOPP) liner backing at a coating weight of approximately 0.8 g/m² and onto one side of a 2 mil (0.0508 mm) thick, primed polyester terephthalate (PET) film (referred to hereafter as HOSTAPHAN PET liner backing, commercially available from Mitsubishi Polyester, Greer, S.C.) at a coating weight of approximately 0.8 g/m², using a 3 Roll Offset Gravure Coater (commercially available from Straub, Minneapolis, Minn.) having a 200 lines/inch (78 lines/cm) gravure roll.

The BOPP- and PET-coated liner backings were subjected to a total energy of 40 milliJoules/square centimeter (mJ/cm²) of UVC ultraviolet radiation, as measured by a UV POWER PUCK on UVC mode from EIT Inc., Sterling, Va., using a GEO AETEK International Model QC 250244 ANIR cure chamber, commercially available from Fusion UV Curing Systems, Rockville, Md., with one medium pressure mercury light, at a power setting of 125 Watts/inch to provide "Liner A" and "Liner B", respectively. "Liner C" was a 2 mil (0.0508 mm) thick PET liner backing with 7200/7200 silicone on both sides, commercially available from Daubert Coated Products, Westchester, Ill.

A 62 mil (1.57 mm) thick 0.5% by weight carbon black containing, acrylic foam adhesive tape comprising a 58 mil (1.47 mm) thick uncrosslinked acrylic foam core with a 2 mil (0.0508 mm) thick, crosslinked, acrylic pressure sensitive adhesive laminated to both sides and a release liner on one adhesive was produced by a process identified in Example 1 of U.S. Pat. No. 6,103,152, with the following modifications: Hot melt composition 10 (including 90 parts 2-ethylhexyl acrylate and 10 parts acrylic acid), was combined with 1.0% by weight F-100D expandable polymeric microspheres, commercially available from Pierce Stevens, Buffalo N.Y., and 1% by weight of a 50% carbon black pigment concentrate in ethylene vinyl acetate resin (4900 CMB), commercially available from Poly One Corporation, Eagan, Minn., and the film adhesive was laminated to both sides of the foam core.

Four different methods were used to evaluate the effect of E-Beam radiation having a dosage of 6 Mrads and an accelerating voltage of 300 keV on liner release. An Energy Sciences Inc. (ESI) ELECTROCURTAIN CB-300 E-Beam unit (Wilmington, Mass.) was used to treat the samples. Laminate samples of the adhesive foam tape, with Liners A, B, or C on one side, were prepared and tested under the following conditions:

Condition 1: The coated side of the test liner was E-Beam treated. The adhesive side of the adhesive foam tape was separately E-Beam treated. Immediately (i.e., within 30–60 seconds), the E-Beam treated side of the test liner was laminated to the E-Beam treated side of the adhesive foam tape using a 4.5 lb (2.0 kg) roller.

Condition 2: The adhesive side of the adhesive foam tape was E-Beam treated. Then, the coated side of the test liner was immediately laminated to the E-Beam treated side of the adhesive foam tape using a 4.5 lb (2.0 kg) roller.

Condition 3: The coated side of the test liner was E-Beam treated. Then the E-Beam treated side of the test liner was immediately laminated to the adhesive side of the adhesive foam tape using a 4.5 lb (2.0 kg) roller. This condition tested a release material for its utility as a coating for the second side of a liner (second coating 25 of liner 20).

Condition 4: The coated side of the test liner was laminated to the adhesive side of the adhesive foam tape using a 4.5 lb (2.0 kg) roller. Then the laminate was E-beam treated on the non-coated (exposed) side of the test liner. This condition tested a release material for its utility as a coating for the first side of a liner (first coating 22 of liner 20).

E-Beam treatment was carried out at a low oxygen level (i.e., less than 10 ppm; typically less than 2.5 ppm).

The samples were tested for release properties according to the Test Methods described above after dwelling approximately 24 hours at room temperature. Liners, Conditions, and Release Values are given in Table 2.

TABLE 2

| | | | Release Values | |
|---|---|---|---|---|
| Condition | Liner | Replicate No. | Ave. Release, g/in (g/cm) | Ave. g/in (g/cm) |
| 1 | C | 1 | 1152 (454) | 1134 (446) |
| | | 2 | 1115 (439) | |
| | A | 1 | 1115 (439) | 1209 (476) |
| | | 2 | 1302 (513) | |
| | B | 1 | 74 (29) | 70 (28) |
| | | 2 | 65 (26) | |
| 2 | C | 1 | 24 (9) | 26 (10) |
| | | 2 | 28 (11) | |
| | A | 1 | 34 (13) | 31 (12) |
| | | 2 | 29 (11) | |
| | B | 1 | 19 (7) | 18 (7) |
| | | 2 | 18 (7) | |
| 3 | C | 1 | 1893 (745) | 1912 (753) |
| | | 2 | 1932 (761) | |
| | A | 1 | 1737 (639) | 1739 (685) |
| | | 2 | 1742 (686) | |
| | B | 1 | 80 (32) | 85 (33) |
| | | 2 | 89 (35) | |
| 4 | C | 1 | 35 (14) | 34 (13) |
| | | 2 | 34 (13) | |
| | A | 1 | 89 (35) | 81 (32) |
| | | 2 | 74 (29) | |
| | B | 1 | 34 (13) | 34 (13) |
| | | 2 | 35 (13) | |

From the data, it can be seen that the most detrimental condition for liner release is Condition 3. The average liner release values increased to 1912 g/in (753 g/cm) for Liner C under Condition 3, from 26 g/in (10 g/cm) for Condition 2. This was even more detrimental to liner release than E-Beam radiating the test liner and the adhesive foam tape separately and then laminating together (Condition 1), which caused release to increase to 1134 g/in (446 g/cm). This was the second most detrimental condition. E-Beam treating the liner and adhesive foam tape together (Condition 4) had very little effect on increasing the liner release similar to Condition 2. Liner release for Condition 2 might have even dropped because of the adhesive surface being more crosslinked.

Liner B had the best performance and resistance to E-Beam treatment. The average liner release of 18 g/in (7 g/cm) for the lowest test condition (Condition 2) increased to 85 g/in (33 g/cm) for the most severe test condition (Condition 3). Liner A, with the same silicone release coating and approximate coating weight did not perform as well as Liner B. This shows that the liner backing has an effect on the release performance, which should be considered when making the liner.

Condition 3 was identified as the best condition to evaluate the E-Beam stability of release liners. This condition simulates actual E-Beam treatment of an adhesive foam tape through the liner and winding in a continuous process. The non-E-Beam treated side of the adhesive foam tape in this process would contact E-Beam treated liner surface when wound up into a roll.

Examples 2a and 2b

The effect of aging on E-Beam treated silicone liner at room temperature before laminating to an adhesive foam tape was determined.

Test Liners A, B, and C of Example 1 were irradiated through the coated side with E-Beam at a dosage of 6 Mrads and at an accelerating voltage of 300 keV at a low oxygen level. The irradiated samples were then aged at room temperature for 5 days or 19 days as indicated in Table 3. The E-Beam treated side of the test liners was laminated to a non-E-Beam treated adhesive side of the adhesive foam tape of Example 1 and then the laminate samples were tested as in Example 1 for liner release after approximately 2 days (Example 2a) or approximately 1 day (Example 2b) dwell time at room temperature.

These results can be compared to Condition 3 liner release values after 24 hours in Example 1. The E-Beam effect on liner release decreased with time before laminating the E-Beam treated test liner to the adhesive side of the adhesive foam tape. The results are shown in Table 3 below.

Example 3

The effect of a second E-Beam treatment on release properties of E-Beam treated liners at room temperature was determined.

Test Liners A, B, and C of Example 1 were exposed, on their coated side, to a first E-Beam treatment of 6 Mrads and an accelerating voltage of 300 keV. After 19 days at room temperature, the once irradiated coated sides of Liners A, B, and C were subjected to a second E-Beam treatment of 6 Mrads and an accelerating voltage of 300 keV. The E-beam treated side of the test liner was then laminated immediately to an adhesive side of the adhesive foam tape of Example 1, i.e., Condition 3 of Example 1. After a dwell time of approximately 1 day at room temperature, the laminate sample was tested for liner release as in Example 1. The results are shown in Table 3 below.

TABLE 3

| Liner | Rep. No. | Ex. 2a Liner aged 5 Days; Dwell time 2 days Ave. Release g/in (g/cm) | Ex. 2b Liner aged 19 Days; Dwell time 1 day Avg. Release g/in (g/cm) | Ex. 3 Liner aged 19 Days; E-Beam expose second time; Dwell time 1 day Avg. Release g/in (g/cm) |
|---|---|---|---|---|
| C | 1 | 341 (134) | 86 (34) | 1714 (675) |
|   | 2 | 227 (89) | 107 (42) | 1768 (696) |
| A | 1 | 335 (132) | 156 (61) | 1782 (702) |
|   | 2 | 329 (130) | 148 (58) | 1876 (739) |
| B | 1 | 30 (12) | 39 (15) | 146 (57) |
|   | 2 | 29 (11) | 37 (15) | 154 (61) |

From the data, it can be seen that for these examples, liner release decreased when the E-beam treated test liner was aged at room temperature before the test liner was laminated to the adhesive foam tape. This also shows that the effect of E-Beam radiation on silicone liner release is not always permanent. Liner release did, however, increase to the level of a non-aged, E-Beam treated test liner laminated to an adhesive side of the adhesive foam tape (Example 1) after a second exposure to the E-Beam radiation (Example 3). This shows that a silicone liner cannot be pretreated with E-Beam radiation to stabilize the liner release from the effect of a second E-Beam exposure.

Example 4

The samples prepared in Example 1 were tested for 90 Degree Peel Adhesion to determine the effect of the silicone release coating and E-Beam treatment on adhesion. Samples were prepared and tested according to the 90 Degree Peel Adhesion Test Method described hereinabove. Three substrates were tested after a 4 day room temperature dwell: Stainless Steel (SS), Aluminum, and Glass. Test results are given in Table 4.

TABLE 4

| Condition | Liner | Rep. No. | 90 Deg. Peel Adhesion, piw (N/mm) | | |
|---|---|---|---|---|---|
| | | | Stainless steel | Aluminum | Glass |
| 1 | C | 1 | 10.58 (1.85) | 12.54 (2.20) | 10.06 (1.76) |
| | | 2 | 10.93 (1.91) | 11.72 (2.05) | 9.63 (1.69) |
| | | Avg. | 10.76 (1.88) | 12.13 (2.12) | 9.85 (1.72) |
| | A | 1 | 11.71 (2.05) | 11.05 (1.94) | 8.56 (1.50) |
| | | 2 | 11.28 (1.98) | 10.94 (1.92) | 9.66 (1.69) |
| | | Avg. | 11.49 (2.01) | 11.00 (1.93) | 9.11 (1.60) |
| | B | 1 | 10.32 (1.81) | 11.44 (2.00) | 10.69 (1.87) |
| | | 2 | 10.98 (1.92) | 11.07 (1.94) | 8.91 (1.56) |
| | | Avg. | 10.65 (1.87) | 11.26 (1.97) | 9.80 (1.72) |
| 2 | C | 1 | 10.67 (1.87) | 10.54 (1.85) | 8.25 (1.44) |
| | | 2 | 9.54 (1.67) | 10.40 (1.82) | 8.70 (1.52) |
| | | Avg. | 10.10 (1.77) | 10.47 (1.83) | 8.47 (1.48) |
| | A | 1 | 10.27 (1.80) | 10.27 (1.80) | 8.27 (1.45) |
| | | 2 | 10.21 (1.79) | 9.39 (1.64) | 8.77 (1.54) |
| | | Avg. | 10.24 (1.79) | 9.83 (1.72) | 8.52 (1.49) |
| | B | 1 | 10.39 (1.82) | 10.58 (1.85) | 8.36 (1.46) |
| | | 2 | 10.73 (1.88) | 10.71 (1.88) | 8.24 (1.44) |
| | | Avg. | 10.56 (1.85) | 10.64 (1.86) | 8.30 (1.45) |
| 3 | C | 1 | 14.14 (2.48) | 20.37 (3.57) | 16.38 (2.87) |
| | | 2 | 19.71 (3.45) | 18.18 (3.18) | 19.20 (3.36) |
| | | Avg. | 16.92 (2.96) | 19.28 (3.38) | 17.79 (3.12) |
| | A | 1 | 15.13 (2.65) | 18.33 (3.21) | 19.05 (3.34) |
| | | 2 | 18.16 (3.18) | 17.03 (2.98) | 18.17 (3.18) |
| | | Avg. | 16.65 (2.92) | 17.71 (3.10) | 18.61 (3.26) |
| | B | 1 | 18.17 (3.18) | 17.05 (2.99) | 16.88 (2.96) |
| | | 2 | 19.62 (3.435) | 14.55 (2.54) | 19.16 (3.36) |
| | | Avg. | 18.90 (3.31) | 15.80 (2.77) | 18.02 (3.16) |
| 4 | C | 1 | 13.92 (2.44) | 17.93 (3.14) | 17.53 (3.07) |
| | | 2 | 14.19 (2.48) | 16.89 (2.96) | 14.46 (2.53) |
| | | Avg. | 14.05 (2.46) | 17.41 (3.05) | 16.00 (2.80) |
| | A | 1 | 14.84 (2.60) | 16.50 (2.89) | 15.07 (2.64) |
| | | 2 | 16.85 (2.95) | 17.40 (3.05) | 14.59 (2.56) |
| | | Avg. | 15.84 (2.77) | 16.95 (2.97) | 14.83 (2.60) |
| | B | 1 | 16.35 (2.86) | 21.82 (3.82) | 14.09 (2.47) |
| | | 2 | 18.12 (3.17) | 16.51 (2.89) | 16.37 (2.87) |
| | | Avg. | 17.24 (3.02) | 19.17 (3.36) | 15.23 (2.68) |

From the data, it can be seen that the adhesion results were the best for the samples from Conditions 3 and 4 testing. Condition 3 liners also had the highest liner release. This indicates that the E-Beam treated silicone coating does not significantly affect peel adhesion, but does significantly affect the liner release force.

The lower adhesion results for Conditions 1 and 2 may be related to how the adhesive foam tape was E-Beam treated. E-Beam treatment of the adhesive foam tape further crosslinks the adhesive on the surface of the foam tape, which lowers its adhesion. The worst condition for adhesion is E-Beam treating the adhesive foam tape without a liner is in low oxygen conditions (Conditions 1 and 2). The best way to maintain adhesion for this adhesive foam tape is to E-Beam crosslink the adhesive foam tape through the liner (Condition 4).

Example 5

The effect of oxygen concentration in the E-Beam chamber on liner release was determined.

The concentration of oxygen is one variable that can be controlled in the E-Beam treatment process and has been found to affect liner release and, possibly, the adhesion of a non-linered, E-Beam crosslinked adhesive. We believe the amount of oxygen in the chamber directly relates to the degree of oxidation of the release surface (or the amount of peroxide formed). This in turn affects liner release.

Test Liner B of Example 1 was tested under Condition 3 of Example 1 with a dosage of 6 Mrads and an accelerating voltage of 300 keV, except the amount of oxygen in the E-Beam chamber was varied. The oxygen level in the E-Beam exposure chamber was controlled by measured introduction of oxygen through a port in the E-Beam chamber. The oxygen level was controlled by bleeding the desired amount of oxygen into the atmosphere control system of the E-Beam chamber. The oxygen level in the E-Beam chamber was monitored by an AMETEK Thermox CG-1000 oxygen analyzer, available from Ametek, Paoli, Pa.

The laminated samples were allowed to dwell at room temperature for approximately 24 hours before testing for liner release according to the Test Method discussed above. The values for average oxygen level and oxygen range reported in Table 5 are readings that were observed for the duration of the E-Beam treatment of the test liner. Test results are presented in Table 5.

TABLE 5

| Oxygen Level (ppm) [Oxygen range (ppm)] | Replicate No. | Liner release g/in (g/cm) | Avg. liner release g/in (g/cm) |
|---|---|---|---|
| 2 [1.5–2.5] | 1 | 80 (32) | 85 (33) |
|  | 2 | 89 (35) |  |
| 0.1 [0.0–0.2] | 1 | 17 (7) | 17 (7) |
|  | 2 | 17 (7) |  |
| 90 [75–105] | 1 | 565 (222) | 528 (208) |
|  | 2 | 491 (193) |  |
| 500 [400–600] | 1 | 863 (340) | 934 (368) |
|  | 2 | 1004 (395) |  |
| 1000 [850–1150] | 1 | 1041 (410) | 1054 (415) |
|  | 2 | 1067 (420) |  |
| 0* [0–<1] | 1 | 82 (32) | 80 (32) |
|  | 2 | 79 (31) |  |
| 1.4* [1–2] | 1 | 83 (33) | 82 (32) |
|  | 2 | 81 (32) |  |
| 3* [2–4] | 1 | 106 (42) | 102 (40) |
|  | 2 | 98 (39) |  |
| 5* [4–6] | 1 | 134 (53) | 125 (49) |
|  | 2 | 117 (46) |  |
| 32.5* [25–40] | 1 | 128 (50) | 128 (50) |
|  | 2 | 129 (51) |  |
| 45* [40–50] | 1 | 182 (72) | 182 (72) |
|  | 2 | 182 (72) |  |
| 90* [75–105] | 1 | 255 (100) | 247 (97) |
|  | 2 | 238 (94) |  |

* = second set of testing performed at a different time

From the data, it can be seen that the oxygen level in the E-Beam chamber has a significant effect on liner release. As the oxygen level increases, liner release increases. The oxygen level in the E-Beam chamber is preferably less than about 150 ppm, preferably less than about 100 ppm, more preferably less than about 50 ppm, even more preferably less than about 25 ppm, most preferably less than about 10 ppm whenever an adhesive tape is treated through the liner.

Comparative Example 6

Five standard, commercially available 2 mil (0.0508 mm) thick silicone-coated polyester (PET) liners, commercially available from Daubert Coated Products Inc., Westchester, IL, were evaluated to determine the best available conventional silicone liner for E-Beam stability. Two different lots of each silicone liner were evaluated and are identified as Roll No. 1 and 1A. The PET liner substrate was chosen because it appeared to be the best substrate for release coatings and it appeared to have the best E-Beam stability.

These liners were E-Beam treated according to Condition 3 of Example 1 at a low oxygen level and laminated to the adhesive foam tape of Example 1. The laminated samples were allowed to dwell at room temperature for approximately 24 hours and were then tested for liner release according to the Test Method used in Example 1. The test results are shown in Table 6 below.

TABLE 6

| Liner | Commercial Identification | Roll No. | Replicate No. | Liner Release g/in (g/cm) | Avg. Liner Release g/in (g/cm) |
|---|---|---|---|---|---|
| D | PEST 8000A | 1 | 1 | 301 (119) | 299 (118) |
|  |  |  | 2 | 298 (117) |  |
| E | PEST 8000A | 1A | 1 | 304 (120) | 294 (116) |
|  |  |  | 2 | 284 (112) |  |
| F | PESTR 8500 | 1 | 1 | 593 (233) | 585 (230) |
|  |  |  | 2 | 576 (227) |  |
| G | PESTR 8500 | 1A | 1 | 738 (291) | 760 (299) |
|  |  |  | 2 | 783 (308) |  |
| H | PESTR 8600 | 1 | 1 | 599 (236) | 569 (224) |
|  |  |  | 2 | 539 (212) |  |
| I | PESTR 8600 | 1A | 1 | 874 (344) | 878 (346) |
|  |  |  | 2 | 882 (347) |  |
| J | PESTR (matte) | 1 | 1 | 165 (65) | 162*(64) |
|  |  |  | 2 | 159 (63) |  |
| K | PESTR (matte) | 1A | 1 | 165 (65) | 163*(64) |
|  |  |  | 2 | 162 (64) |  |
| C(1) | PET 7200 | 1A | 1 | 1893 (745) | 1912 (753) |
|  |  |  | 2 | 1932 (761) |  |

(1) sample data from Example 1.
(2) * = liner bonded to adhesive

The best commercially available silicone-coated PET liner tested, PEST 8000A, had approximately a 300 g/in (118 g/cm) release value after Condition 3 testing. This was significantly higher (i.e., three times) than Liner B of Example 1, which had a release value of 85 g/in (33 g/cm).

Examples 7a–7g

The following liners were evaluated to determine the effect of silicone formulation, UV intensity, line speed, and silicone coating weight on liner release. Seven silicone liner samples were prepared using the components and procedure of Example 1 and the component amounts of Table 7 below. The resultant compositions were each coated onto one side of a 2 mil (0.0508 mm) thick, HOSTAPHAN PET liner backing, commercially available from Mitsubishi Polyester, Greer, S.C., using the 3 Roll Gravure Coater of Example 1. The coated substrates were then each cured under the conditions specified in Table 7 with ultraviolet (UV) radiation using a Fusion Systems Curing Unit, equipped with FUSION-H bulbs, commercially available from Fusion UV Curing Systems, Rockville, Md., the bulbs having a power supply of 118 Watts/cm.

The liners were laminated to the adhesive foam tape of Example 1 and tested for liner release properties as in Example 1 under Condition 3 and under a low oxygen level.

The samples were tested for liner release according to the Test Methods described above after approximately 24 hours at room temperature. Liner composition, UV Power Setting, coating line speed, coating weight used, and liner release values are given in Table 7.

TABLE 7

| Ex. No. | Silicone Formulation | | | UVC energy (ml) | UV power) watts/in (watts/cm | Line speed fpm (m/min) | Coating weight (g/m²) | Liner release g/in (g/cm) |
|---|---|---|---|---|---|---|---|---|
| | GELEST DMS-S12 (g) | GELEST SIB-1824 (g) | Hexafluoro-antimonate-iodonium salt (g) | | | | | |
| 7a | 85 | 15 | 2 | 40 | 125 (49) | 50 (15) | 0.7 | 133 (52) |
| 7b | 93 | 7 | 2 | 40 | 125 (49) | 50 (15) | 0.8 | 79 (31) |
| 7c | 70 | 30 | 2 | 40 | 125 (49) | 50 (15) | 0.8 | 309 (122) |
| 7d | 85 | 15 | 2 | 20 | 125 (49) | 100 (30) | 0.7 | 119 (47) |
| 7e | 85 | 15 | 2 | 70 | 200 (79) | 50 (15) | 0.7 | 141 (56) |
| 7f | 85 | 15 | 2 | 40 | 125 (49) | 50 (15) | 0.2 | 383 (151) |
| 7g | 85 | 15 | 2 | 40 | 125 (49) | 50 (15) | 1.4 | 79 (31) |

Example 8

Both sides of a HOSTAPHAN PET liner backing, commercially available from Mitsubishi Polyester, Greer, S.C., were coated with a silicone composition prepared as in Example 1 using the following components and amounts: 90 grams GELEST DMS-S12, 10 grams GELEST SIB-1824, and 2 grams hexafluoroantimonate iodonium salt and at an approximate coating weight of 0.7g/m². One side of the PET film was coated, and then the second side was coated. Line speed was 50 feet per minute (38 m/min). The coated PET film was exposed, on both sides, to the UV curing process of Example 1 with the following power settings: 125 watts/in (49 watts/cm) which provided approximately 40 mJ of UVC energy radiation to provide Liner L having Side A (first coating trip) and Side B (second coating trip).

The adhesive was a 45 mil (1.14 mm) thick acrylic adhesive foam tape comprising a 40 mil (1.016 mm) thick uncrosslinked black acrylic foam core with a 2.5 mil (0.0635 mm) thick, uncrosslinked, acrylic pressure sensitive adhesive coextruded on both sides. The adhesive was produced by a process described in Example 31 of U.S. Pat. No. 6,103,152 and having Hot Melt Composition 10 for both the foam and adhesive layers, and 1% by weight of 4900 CMB (pigment concentrate).

Side A of Liner L was E-Beam treated with 300 keV/6 Mrads at low oxygen environment. Side A of Liner L was then combined with the adhesive foam tape as in Condition 3 of Example 1 laminate to adhesive foam tape. Samples were likewise prepared wherein the adhesive foam tape was combined with Side B of Liner L as in Condition 3 of Example 1. Liner release was measured after approximately 24 hour room temperature dwell as in Example 1 using an I-MASS tester (Model SP-2000 Slip/Peel Tester), commercially available from IMASS, Inc., Accord (Hingham) MA. Results are shown in Table 8 below.

TABLE 8

| Side of Liner L | Liner Release, g/in (g/cm) |
|---|---|
| A | 48 (19) |
| B | 25 (10) |

Example 9

Six liner samples were prepared from primed and unprimed 5 mil (0.127 mm) thick coextruded trilayer polyethylene (PE) film liner backing. The trilayer polyethylene film liner backing comprised 0.5 mil (0.0127 mm) low-density polyethylene, 4.0 mil (0.102 mm) thick high-density polyethylene, and 0.5 mil (0.0127 mm) thick medium density polyethylene. The liner had been flame treated to a dyne level of greater than 50. The trilayer liner backings were coated on the low-density polyethylene side with a silicone composition at various coating weights. The liners were treated with different levels of primers to determine the effect of priming the PE liner backings before coating with the silicone compositions.

Two test liners (Test Liners M and N) were prepared as in Example 7 by coating the silicone composition: (85 grams GELEST DMS-S12, 15 grams GELEST SIB-1824, and 2 grams hexafluoroantimonate iodonium salt) on the flame treated, low-density polyethylene side of the PE film described above, and cured as in Example 1 at 50 feet per minute (15 m/min) speed, and with a power setting of 125 Watts for a total of 40 mJ of UVC energy. Test Liners M and N were prepared at coating weights of 0.9 g/m² and 1.9 g/m² respectively.

Four test liners (Test Liners O, P, Q, and R) were prepared like Test Liners M and N except that a layer of a 5% by weight solids content primer solution comprising a mixture of polyisobornyl acrylate, 2% by weight IRGANOX 1010 (commercially available from Ciba-Geigy Corporation, Hawthorne, N.Y.), and ethyl acetate was coated at a coating weight of 0.1 g/m² or 0.7 g/m² on the flame treated, polyethylene side of the PE liner backing, and dried in an oven. Then the silicone composition was coated onto the dried primer layer. The primer was coated and dried in an oven before being coated with the silicone coating in a second operation.

The liner was then irradiated with E-Beam at a dosage of 6 Mrads and an accelerating voltage of 300 keV under a low oxygen level. Then the irradiated side of the liner was immediately (within one minute) laminated to the adhesive foam tape used in Example 8, following Condition 3 of Example 1.

The coating weights of the primer composition and the silicone composition are given in Table 9. The laminates were tested for liner release as in Example 8 after a dwell time of approximately 24 hours at room temperature. Results are shown in Table 9 below.

TABLE 9

| Test Liner | Primer | Silicone Composition | Liner Release, g/in (g/cm) |
|---|---|---|---|
| M | 0.0 | 0.9 | 831 (327) |
| N | 0.0 | 1.9 | 26 (10) |
| O | 0.1 | 0.9 | 813 (320) |
| P | 0.1 | 1.9 | 55 (22) |
| Q | 0.7 | 0.9 | 39 (15) |
| R | 0.7 | 1.9 | 37 (15) |

Coating weight g/m² (column header spanning Primer and Silicone Composition)

The results above show the importance of having a high silicone coating weight of 1.9 g/m² on both flame treated PE film (Test Liner N) or lightly primed PE film (i.e., 0.1 g/m², Test Liner P). Low silicone coating weights (Test Liners M and O) have less preferred release values (i.e., greater than 280 g/in (110.24 g/cm)) after being E-Beam treated. A higher primer coating weight of 0.7 g/m² allows for use of lower silicone coating weight (Test Liner Q). These liners (Test Liner Q and R) have acceptable release values after exposure to E-Beam at a dosage of 6 Mrads and an accelerating voltage of 300 keV.

Examples 10a and 10b

A two-sided differential release, 5 mil (0.127 mm) thick polyethylene liner, which was corona treated on both sides using a treatment level of between 45–60 dynes was prepared as follows:

Side 1: A release coating solution was prepared by mixing at room temperature, 40 grams UV 9430 (epoxy silicone), 60 grams UV9315 (epoxy silicone), and 2 grams UV 9380, all commercially available from General Electric, Waterfort, N.Y. The resulting solution was coated with a 3 Roll Offset Gravure Coater, commercially available from Straub, Minneaoplis Minn., onto a first side of a 5 mil (0.127 mm) thick polyethylene film liner backing of Example 9 that had been corona treated at a power setting of 1.4 kW and a line speed of 100 fpm (30 m/min), and cured with 300 W/in (118 w/cm) Fusion-H lamps, commercially available from Fusion UV Curing Systems, Rockville, Md., at a line speed of 50 fpm (15 m/min) and UVC energy of greater than 40 mJ/cm². The dry coating weight was approximately 0.8 g/m². The single side coated liner backing thus prepared was wound up in a roll.

Side 2: The above single side coated liner backing was unwound and coated on its second (uncoated) side with the release coating composition of Example 8. Prior to coating the release composition onto the second side, the second side of the liner backing was corona treated at a power setting of 1.4 kW and a line speed of 100 fpm (30 m/min). After coating the release composition on the second side of the liner backing, the release composition was cured at the same conditions as the release coating composition on Side 1. The dry coating weight was approximately 1.5 g/m².

Example 10a was prepared by laminating Side 1 of the test liner to the adhesive foam tape of Example 8, then E-Beam treating at a dosage of 6 Mrads, and an accelerating voltage of 300 keV under low oxygen level through the exposed side of the test liner (Condition 4 of Example 1).

Example 10b was prepared by E-Beam treating Side 2 of the test liner at a dosage of 6 Mrads and an accelerating voltage of 300 keV under low oxygen level and immediately laminating Side 2 of the test liner to the adhesive foam tape of Example 8 (Condition 3 of Example 1).

The laminate samples of Example 10a and 10b were allowed to dwell at room temperature for approximately 24 hours and then tested for liner release. Results are presented in Table 10.

TABLE 10

| Ex. No. | Liner Release g/in (g/cm) |
|---|---|
| 10a | 88.7 (34.9) |
| 10b | 20.2 (8.0) |

This test liner showed no liner confusion when unwound after being wound up into a roll for over one week at room temperature. This liner allows for the manufacture of an adhesive article that has been E-Beam treated through the liner to crosslink the adhesive and maintain maximum adhesion.

Comparative Example 11a, Example 11b, and Reference Example

A release coating solution was prepared by mixing 4.85 grams of DC-7850 (commercially available from Dow Corning Corporation, Midland, Mich.), 0.15 grams of DC-7488 (typical platinum addition cure chemistry), and 20 grams of heptane at room temperature. The resulting solution was coated with a No. 3 rod onto one side of a HOSTAPHAN PET liner backing, commercially available from Mitsubishi Polyester, Greer, S.C., and cured in an oven at 150 degrees Celsius for 3 minutes. The dry coating weight was approximately 1.2 g/m².

The coated side of the test liner thus prepared was either exposed to E-Beam radiation at a dosage of 6 Mrads and an accelerating voltage of 300 keV under a low oxygen level and then laminated immediately to the adhesive foam tape of Example 8 (Condition 3 of Example 1) to provide Comparative Example 11a or laminated to the adhesive foam tape of Example 8. The sample was then E-Beam treated through the liner (Condition 4 of Example 1) to provide Example 11b.

In addition, the coated side of the test liner was laminated to 3M BOOK TAPE 845 (available from 3M Co, St. Paul, Minn.) to provide Reference Example 11c. The liner release of the laminate samples were tested according to the test method outlined hereinabove after the dwell times and conditions specified in Table 11. The data is presented in Table 11.

Comparative Example 12

A release coating was prepared by mixing 100 grams of UV9400 (epoxy silicone) and 3 grams of UV9380 (both are commercially available from GE, Waterfort, N.Y.) at room temperature. The resulting solution was coated with a 5 Roll Coater on one side of HOSTAPHAN PET liner backing (commercially available from Mitsubishi Polyester, Greer, S.C.) and cured with a 300 W/in (118 W/cm) H FUSION-lamp, commercially available from Fusion UV Curing Systems, Rockville, Md., at a line speed of 50 fpm (15 m/min). The dry coating weight was approximately 0.7 g/m².

The coated side of the test liner, thus prepared, was exposed to E-Beam radiation at a dosage of 6 Mrads and an accelerating voltage of 300 keV under low oxygen level, and immediately laminated to the adhesive foam tape of Example 8 (Condition 3 of Example 1). The liner release of the laminate sample was then tested after approximately one day dwell at room temperature according to the test method described above. The data is recorded in Table 11.

TABLE 11

| | | Liner Release, g/in (g/cm) | | |
|---|---|---|---|---|
| Ex. No. | Condition | After 1 day at RT | After 3 days at RT | After 3 days at 70° C. and then 4 hours at room temperature |
| 11a-Comparative | 3 | Blocked | Not tested | Not tested |
| 11b | 4 | 17.1 (6.7) | Not tested | Not tested |
| 11c-Reference | N/A | 7.8 (3.1) | 18.2 (7.2) | 20.8 (8.2) |
| 12-Comparative | 3 | 449 (177) | Not tested | Not tested |

This data indicates that if there are too many functional groups present in the release composition, or if a tight crosslink network is not formed, the liner release is not as preferred (i.e., greater than 280 g/in (110 g/cm)) for use as coating for the second side of the liner (i.e., second release coating 25 of liner 20).

Examples 13a and 13b and Reference Example 13c

A release coating was prepared by mixing 5 grams of mixed epoxy silicone having an epoxy equivalent weight of 830 units, prepared according to procedures disclosed in U.S. Pat. No. 5,409,773, 0.2 grams of 50% solids by weight bisdodecylphenyliodonium hexafluoroantimonate in dodecyl alcohol, and 20 grams of heptane at room temperature.

The resulting solution was coated with a No. 3 Meyer Rod on one side of a HOSTAPHAN PET liner backing, commercially available from Mitsubishi Polyester, Greer, S.C., and cured with a 300 W/in (118 W/cm) H FUSION lamp, commercially available from Fusion UV Curing Systems, Rockville, Md., at a line speed of 50 fpm (15 m/min). The dry coating weight was approximately 1.0 g/m². The average degree of polymerization between crosslinks was calculated to be 11.2, which indicates a tightly crosslinked network.

The coated side of the test liner, thus prepared, was exposed to E-Beam radiation at a dosage of 6 Mrads and an accelerating voltage of 300 keV under a low oxygen level. Example 13a was prepared by laminating the E-Beam treated side of the test liner to the adhesive foam tape of Example 8 immediately after E-Beam irradiating the test liner (Condition 3 of Example 1). Example 13b was prepared by laminating the coated side of the test liner to the adhesive foam tape of Example 8 and then E-Beam treating the laminate sample through the exposed side of the test liner (Condition 4 of Example 1). Reference Example 13c was prepared by laminating the test liner to 3M BOOK TAPE 845 (available from 3M Co, St. Paul, Minn.).

The laminate samples were allowed to dwell as specified in Table 12 and then the liner release was tested according to the test method discussed above. The data is recorded in Table 12.

Example 14

A release coating was prepared by mixing 100 grams of DC7350 (epoxy silicone, commercially available from Dow Corning, Midland, Mich.) and 5 grams of 50% solids by weight bisdodecylphenyliodonium hexafluoroantimonate solution in dodecyl alcohol at room temperature. The resulting release coating was coated with a 5-Roll Coater, commercially available from Straub, Minneapolis, Minn., on one side of a HOSTAPRAN PET liner backing, commercially available from Mitsubishi Polyester, Greer, S.C., and cured with a 300 W/in (118 W/cm) H FUSION lamp, commercially available from Fusion UV Curing Systems, Rockville, Md., at a line speed of 50 fpm (15 m/min). The dry coating weight was approximately 0.6g/m².

The coated side of the test liner thus prepared was exposed to E-Beam radiation at a dosage of 6 Mrads and an accelerating voltage of 300 keV under low oxygen level. The E-Beam treated side of the test liner was immediately laminated to the adhesive foam tape of Example 8 (Condition 3 of Example 1).

The laminate samples were allowed to dwell as specified in Table 12 and then liner release was tested according to the test method discussed hereinabove. The data is presented in Table 12.

TABLE 12

| | | Liner Release g/in (g/cm) | | |
|---|---|---|---|---|
| Ex. No. | Condition | After 1 day at room temperature | After 3 days at room temperature | After 3 days at 70° C. and then 4 hours at room temperature |
| 13a | 3 | 218 (86) | Not tested | Not tested |
| 13b | 4 | 33 (13) | Not tested | Not tested |
| 13c-Reference | N/A | 13 (5) | 19 (8) | 86 (34) |
| 14 | 3 | 253 (100) | Not tested | Not tested |

This data illustrates that some epoxy silicones are useful as coating materials for the second side of a liner (i.e., second release coating 25 of liner 20).

From the foregoing detailed description, the invention has been described in a preferred embodiment. Modifications and equivalents of the disclosed concepts are intended to be included within the scope of the appended claims.

What is claimed is:

1. A method for preparing an adhesive article, said method comprising:
    (a) applying a release coating material to a second side of a liner backing,
    (b) applying an adhesive to a first side of said coated liner backing;
    (c) crosslinking said adhesive with E-Beam radiation applied through the second side of said liner backing;
    wherein the liner release value of the second side of the coated liner backing to the adhesive is less than the liner release value of the first side of the coated liner backing to the adhesive.

2. The method of claim 1, additionally comprising applying a release coating material to the first side of the liner backing.

3. The method of claim 1, additionally comprising winding said article into a roll.

4. The method of claim 1, wherein said liner backing is chosen from: polyester films, polyolefin films, metallized films, sealed papers, metallized papers, clay coated papers, and papers.

5. The method of claim 4, wherein said liner backing is chosen from: polyester films or polyolefin films.

6. The method of claim 5, wherein said liner backing is a polyolefin film.

7. The method of claim 6, wherein said polyolefin film is a polyethylene film.

8. The method of claim 7, wherein said polyethylene film is a multilayered polyethylene film.

9. The method of claim 1, wherein said release coating material comprises at least one compound chosen from:

alkoxysilane compounds, acetoxysilane compounds, and silanol compounds.

10. The method of claim 9, wherein the release coating material comprises silanol-terminated polydimethylsiloxane.

11. The method of claim 1, wherein said release coating material comprises an epoxy silicone.

12. The method of claim 11, wherein said epoxy silicone comprises an epoxy silicone having an average degree of polymerization of less than about 12.

13. The method of claim 1, wherein the release coating material is formed at a weight of at least about 0.7 g/m².

14. The method of claim 1, wherein said release coating material has a sufficiently tightly crosslinked network, levels of polar functionalities and reactive groups such that, upon liner backing exposure to E-Beam radiation to crosslink the adhesive, the liner release value of the second side of the coated liner backing to the adhesive is less than the liner release value of the first side of the coated liner backing to the adhesive.

15. The method of claim 1, wherein said release coating material has a sufficiently tightly crosslinked network, levels of polar functionalities and reactive groups such that, upon liner backing exposure to E-Beam radiation to crosslink the adhesive, the liner release value of the second side of the liner to the first surface of the adhesive and the liner release value of the first side of the liner to the second surface of the adhesive are sufficiently different to avoid liner confusion.

16. The method of claim 1, wherein said E-Beam radiation is at a dosage of from about 5 to 10 Mrads.

17. The method of claim 1, wherein said E-Beam radiation is at a dosage of from about 5 to 7 Mrads.

18. The method of claim 1, wherein said E-Beam radiation is carried out in an atmosphere of less than about 100 ppm oxygen.

19. The method of claim 1, wherein said E-Beam radiation is carried out in an atmosphere of less than 10 ppm oxygen.

20. The method of claim 1, wherein said E-Beam radiation is carried out in an atmosphere of less than about 2.5 ppm oxygen.

21. A method of improving release properties of an adhesive liner upon treatment with through liner E-Beam radiation for crosslinking an adhesive coated on a first side of a liner backing, comprising: coating a second side of a liner backing with a release coating material having a sufficiently tightly crosslinked network, levels of polar functionalities and reactive groups such that, upon treatment with E-Beam radiation through the liner backing to crosslink the adhesive, the liner release value of the second side of the liner backing to the adhesive is less than the liner release value of the first side of the liner backing to the adhesive.

22. A method of improving release properties of an adhesive liner upon treatment with through liner E-Beam radiation for crosslinking an adhesive coated on a first side of a liner backing, comprising: coating a second side of the liner backing with a release coating material having a sufficiently tightly crosslinked network, levels of polar functionalities and reactive groups such that, upon treatment with E-Beam radiation through the liner backing to crosslink the adhesive, the liner release value of the second side of the liner to the first surface of the adhesive and the liner release value of the first side of the liner to the second surface of the adhesive are sufficiently different to avoid liner confusion.

23. A method for preparing an adhesive article, said method comprising:
   (a) applying release coating material to at least a second side of a first liner backing;
   (b) applying release coating material to at least one side of a second liner backing;
   (c) applying an adhesive onto a first side of said coated first liner backing;
   (d) applying the coated side of said second liner to the exposed surface of the adhesive;
   (e) crosslinking said adhesive with E-Beam radiation applied to both sides of the adhesive through said first and second liner backings.

24. The method of claim 23 wherein said adhesive has a thickness of at least about 500 micrometers.

25. The method of claim 23, additionally comprising
   (f) removing the second coated liner backing thereby exposing the adhesive; and
   (g) winding said article into a roll,
   wherein the article has been rolled upon itself causing the second side of the first liner to come into contact with the exposed surface of the adhesive and wherein the liner release value of the second side of the first liner to the adhesive and the liner release value of the first side of the first liner to the adhesive are sufficiently different to avoid liner confusion.

* * * * *

UNITED STATES PATENT AND TRADEMARK OFFICE
CERTIFICATE OF CORRECTION

PATENT NO.       : 6,835,422 B2
APPLICATION NO.  : 10/842830
DATED            : December 28, 2004
INVENTOR(S)      : James J. Kobe It is certified that error appears in the above-identified patent and that said Letters Patent is hereby corrected as shown below:

Column 1,
Lines 4-5, delete "CROSS REFERENCE RELATED TO APPLICATIONS" and insert in place thereof -- CROSS REFERENCE TO RELATED APPLICATIONS --.

Column 3,
Line 66, delete "surface 111" and insert in place thereof -- surface 11 --.

Column 6,
Line 25, delete "$(EtO)_3Si(CH_2)^8Si(OEt)_3$" and insert in place thereof
-- $(EtO)_3Si(CH_2)_8Si(OEt)_3$ --.

Column 7,
Line 25, delete "spray coating," and insert in place thereof -- spray coating; --.
Line 67, delete "aciylic" and insert in place thereof --acrylic --.

Column 20,
Line 18, insert -- 11C -- following "Reference Example".

Column 21,
Line 65, delete "HOSTAPRAN" and insert in place thereof -- HOSTAPHAN --.

Column 22,
Line 40, delete "backing," and insert in place thereof -- backing; --.

Signed and Sealed this

Twentieth Day of February, 2007

JON W. DUDAS
*Director of the United States Patent and Trademark Office*